(12) United States Patent
Tanzawa

(10) Patent No.: US 8,843,547 B2
(45) Date of Patent: Sep. 23, 2014

(54) SERVER APPARATUS AND INFORMATION PROCESSING METHOD

(75) Inventor: Hiroki Tanzawa, Esslingen (DE)

(73) Assignees: Citizen Holdings Co., Ltd., Tokyo (JP); Citizen Systems Japan Co., Ltd., Tokyo (JP)

( * ) Notice: Subject to any disclaimer, the term of this patent is extended or adjusted under 35 U.S.C. 154(b) by 6 days.

(21) Appl. No.: 13/403,533

(22) Filed: Feb. 23, 2012

(65) Prior Publication Data

US 2012/0254296 A1 Oct. 4, 2012

(30) Foreign Application Priority Data

Mar. 30, 2011 (JP) ................................. 2011-076793

(51) Int. Cl.
*G06F 15/16* (2006.01)
*H04L 29/06* (2006.01)

(52) U.S. Cl.
CPC ..................................... *H04L 69/28* (2013.01)
USPC ........ 709/203; 358/1.13; 358/1.14; 358/1.15; 358/421; 358/422; 358/423; 358/501; 399/70; 399/75

(58) Field of Classification Search
CPC ... G06F 3/1285; G06F 3/1229; G06F 3/1221; G06F 11/3062; G06F 17/18; G06F 1/3206; G06F 1/3293; G06F 3/1203; G06F 3/1288; G06F 11/2028; G06F 1/3284; G06F 3/12; G03G 2215/00109; H04N 1/00896
See application file for complete search history.

(56) References Cited

U.S. PATENT DOCUMENTS

| | | | |
|---|---|---|---|
| 6,693,717 B1* | 2/2004 | Teradaira et al. ............. | 358/1.14 |
| 7,675,010 B2* | 3/2010 | Takagi et al. ................. | 219/619 |
| 2004/0201866 A1 | 10/2004 | Maekawa | |
| 2005/0191076 A1* | 9/2005 | Dan ................................ | 399/70 |
| 2005/0271407 A1* | 12/2005 | Fujimori ........................ | 399/70 |
| 2007/0030512 A1 | 2/2007 | Oka | |
| 2007/0047993 A1* | 3/2007 | Brinsley .......................... | 399/75 |
| 2009/0010662 A1* | 1/2009 | Naoi et al. ...................... | 399/44 |
| 2011/0128572 A1* | 6/2011 | Hosotsubo .................... | 358/1.15 |
| 2011/0128579 A1* | 6/2011 | Igarashi et al. .............. | 358/1.15 |
| 2011/0231026 A1* | 9/2011 | Yaoyama ...................... | 700/291 |

FOREIGN PATENT DOCUMENTS

| | | |
|---|---|---|
| JP | 2000112854 | 4/2000 |
| JP | 2003018181 | 1/2003 |
| JP | 2004021481 | 1/2004 |
| JP | 3645401 | 2/2005 |

(Continued)

OTHER PUBLICATIONS

Office Action in Japan for Japanese Application 2011-076793 issued Jun. 11, 2014.

*Primary Examiner* — Dustin Nguyen
*Assistant Examiner* — Hao Nguyen
(74) *Attorney, Agent, or Firm* — Myers Wolin, LLC

(57) ABSTRACT

A server apparatus 120, each time a process request is received from a client apparatus 110, stores the process request for a given interval and if the status of the server apparatus 120 at the time when the process request is received is standby, switches the status to a state of receiving a request. The server apparatus 120 also measures the elapsed time since the status was switched to the state of receiving a request and when the elapsed time since the status was switched to the state of receiving a request, reaches a given period, executes a process that corresponds to a process request stored in a temporary storing unit.

3 Claims, 11 Drawing Sheets

(56) References Cited

FOREIGN PATENT DOCUMENTS

| JP | 2005339499 | 12/2005 | | |
|----|------------|---------|---|---|
| JP | 4030865 | 10/2007 | | |
| JP | 2010-098640 | 4/2010 | | |
| JP | 2010086250 | 4/2010 | | |
| JP | 2010098640 A | * | 4/2010 |

* cited by examiner

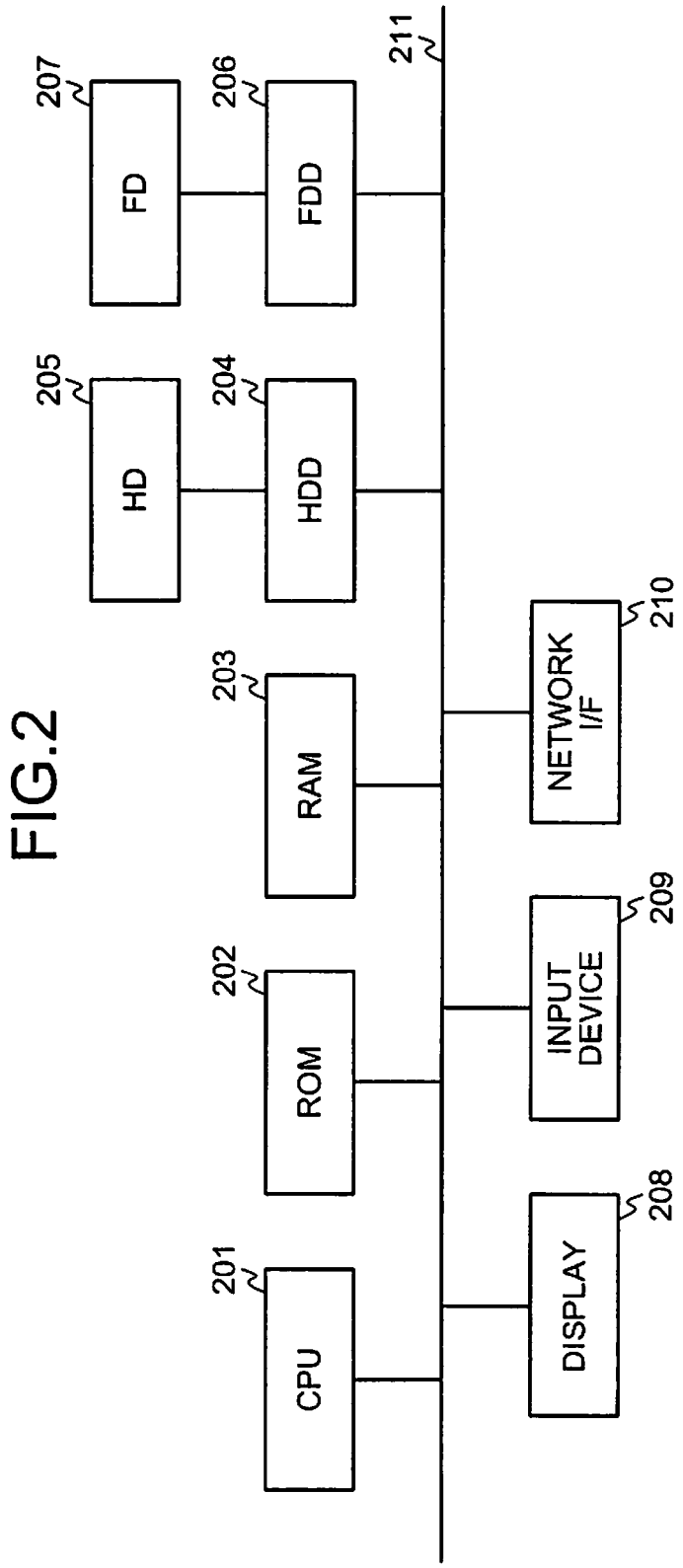

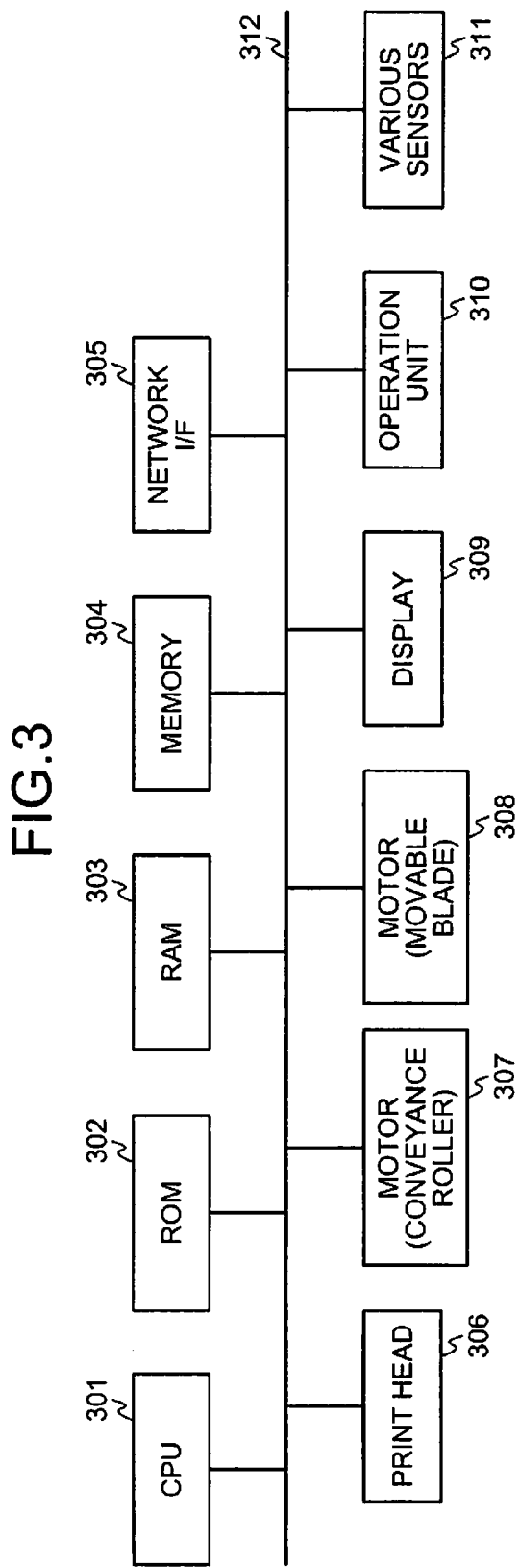

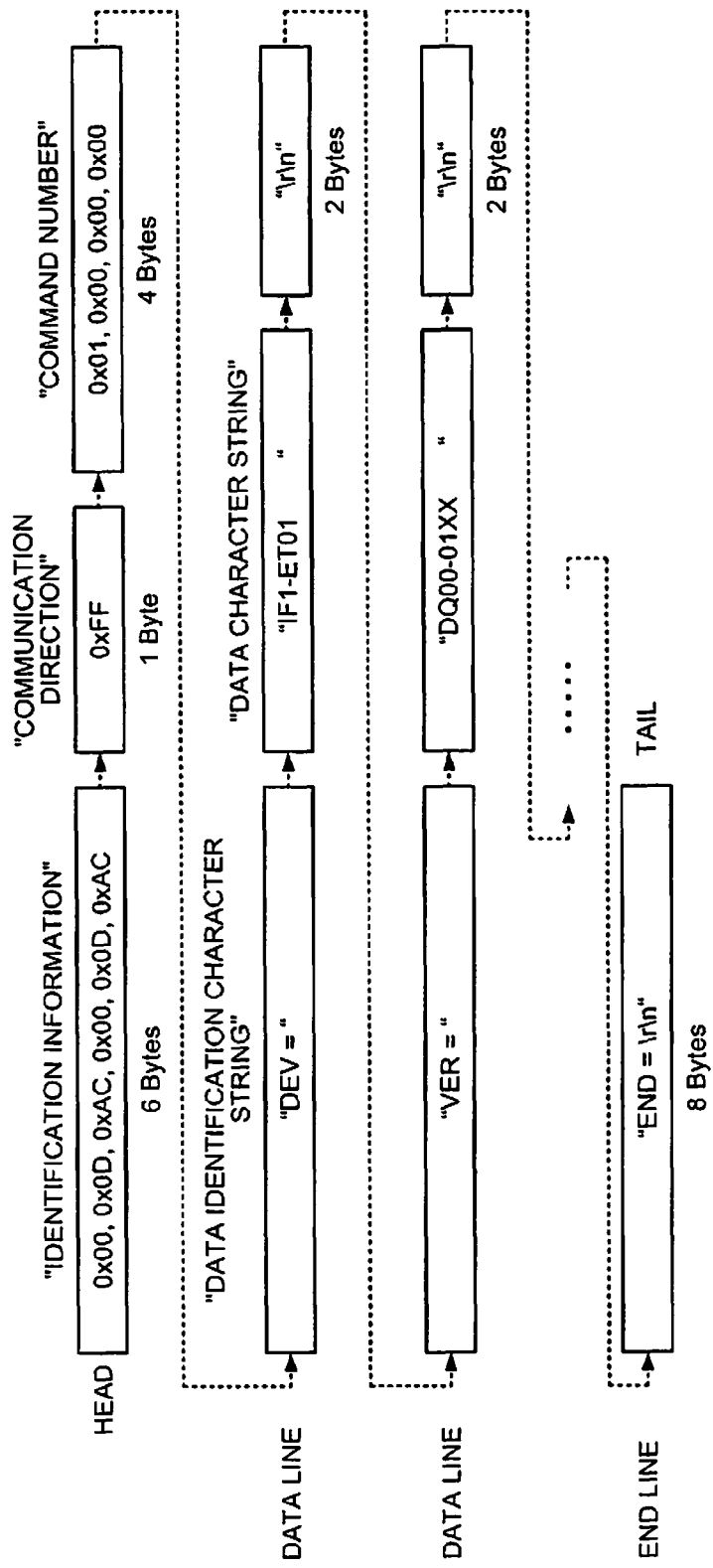

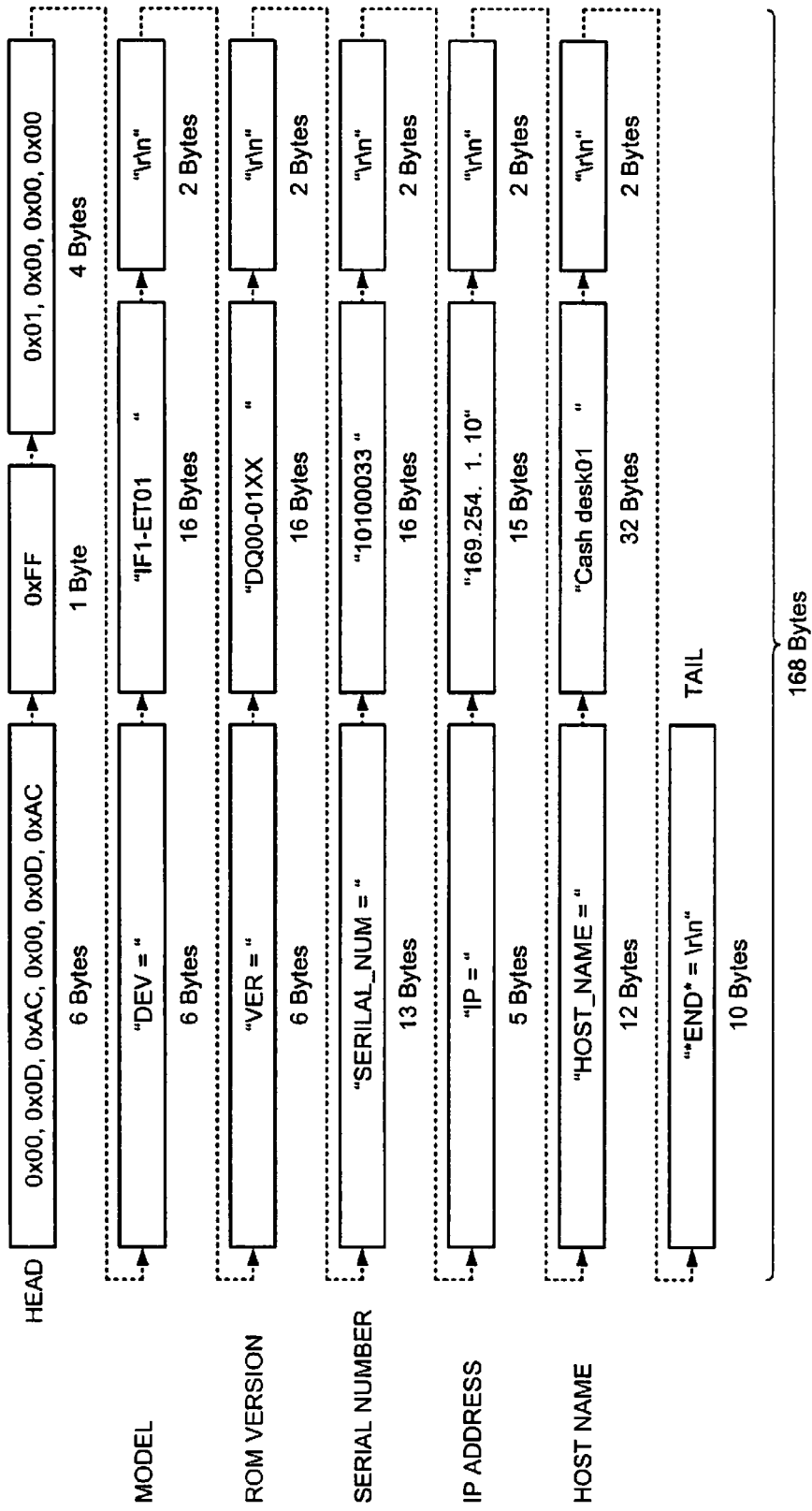

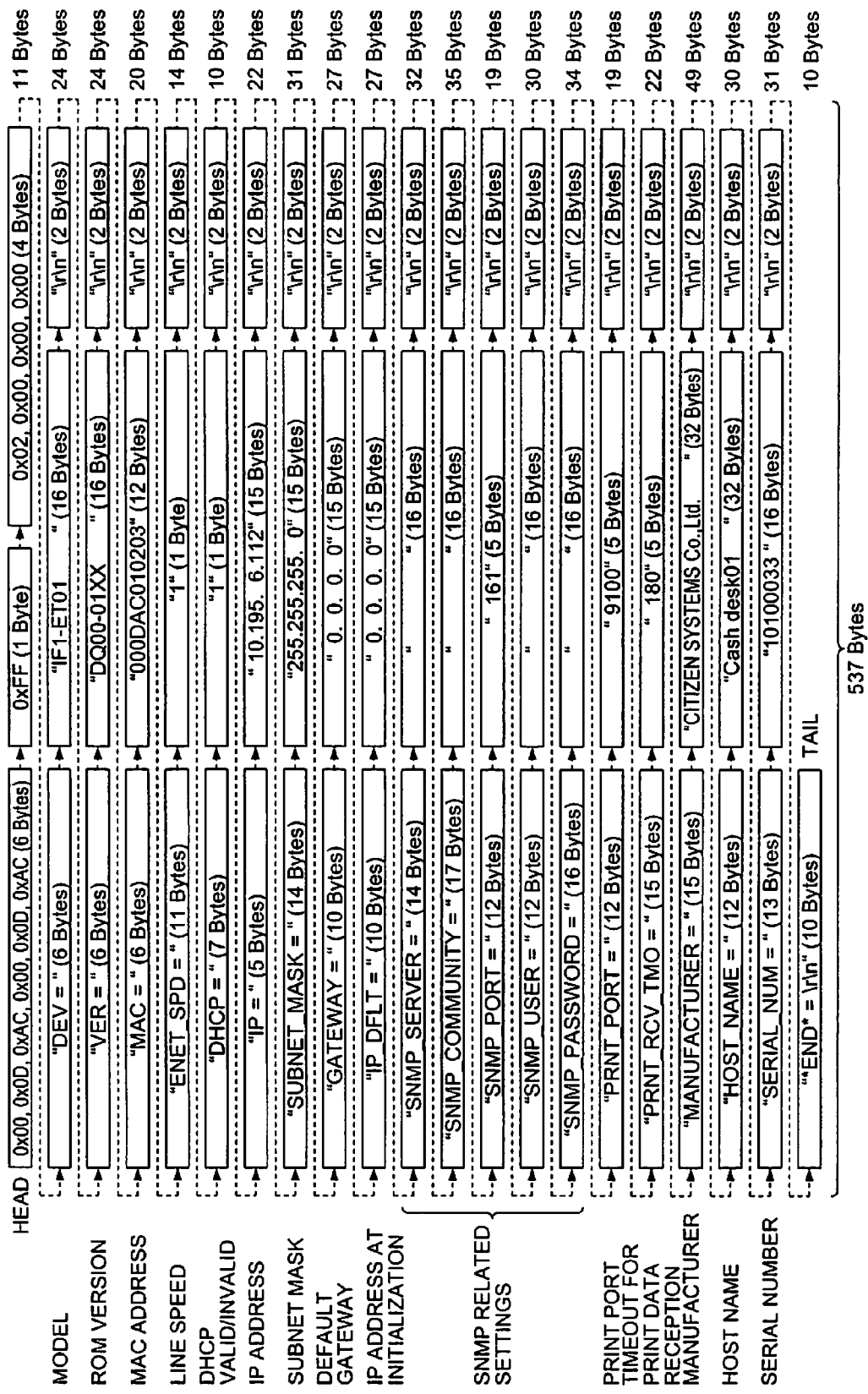

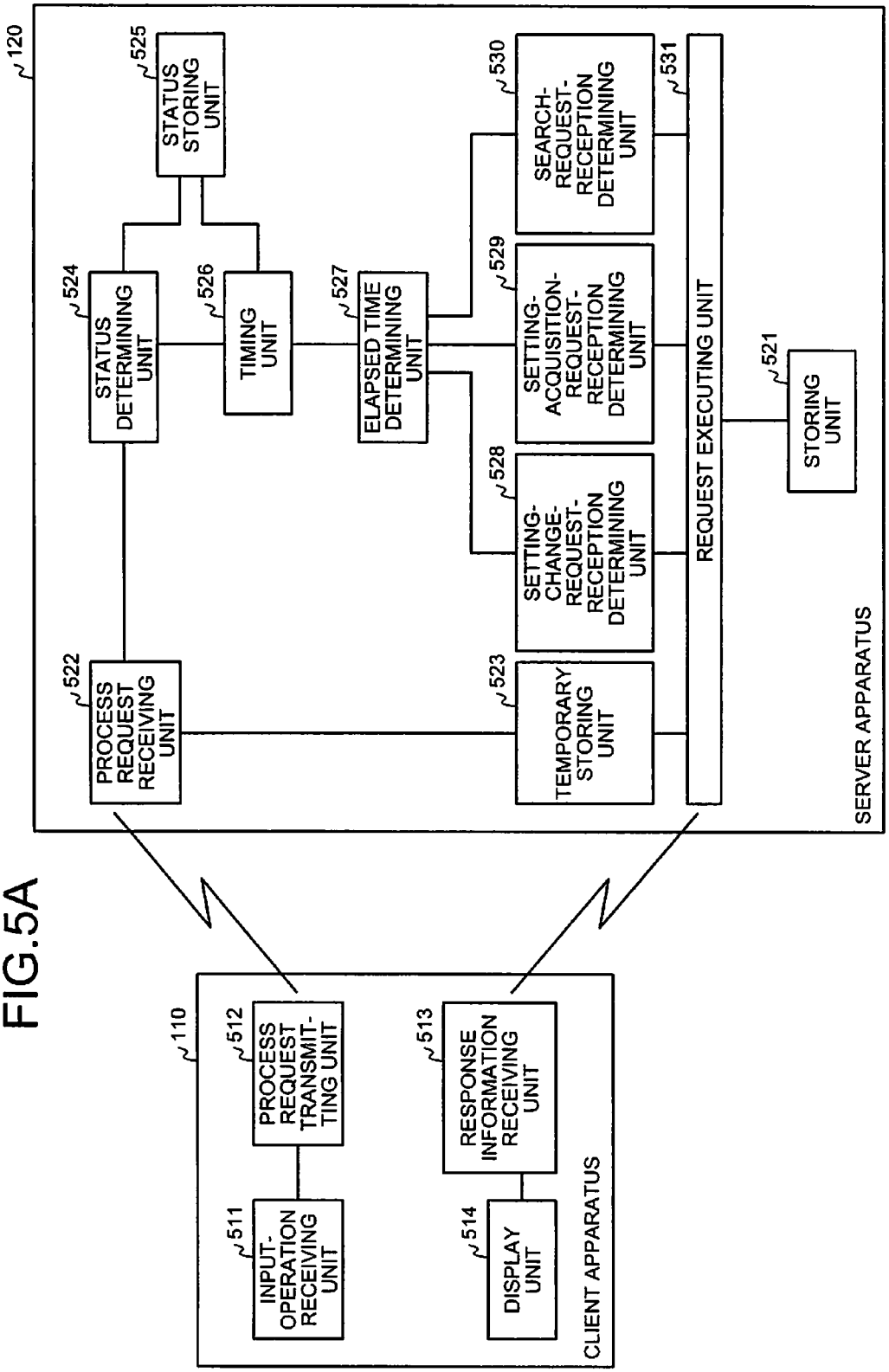

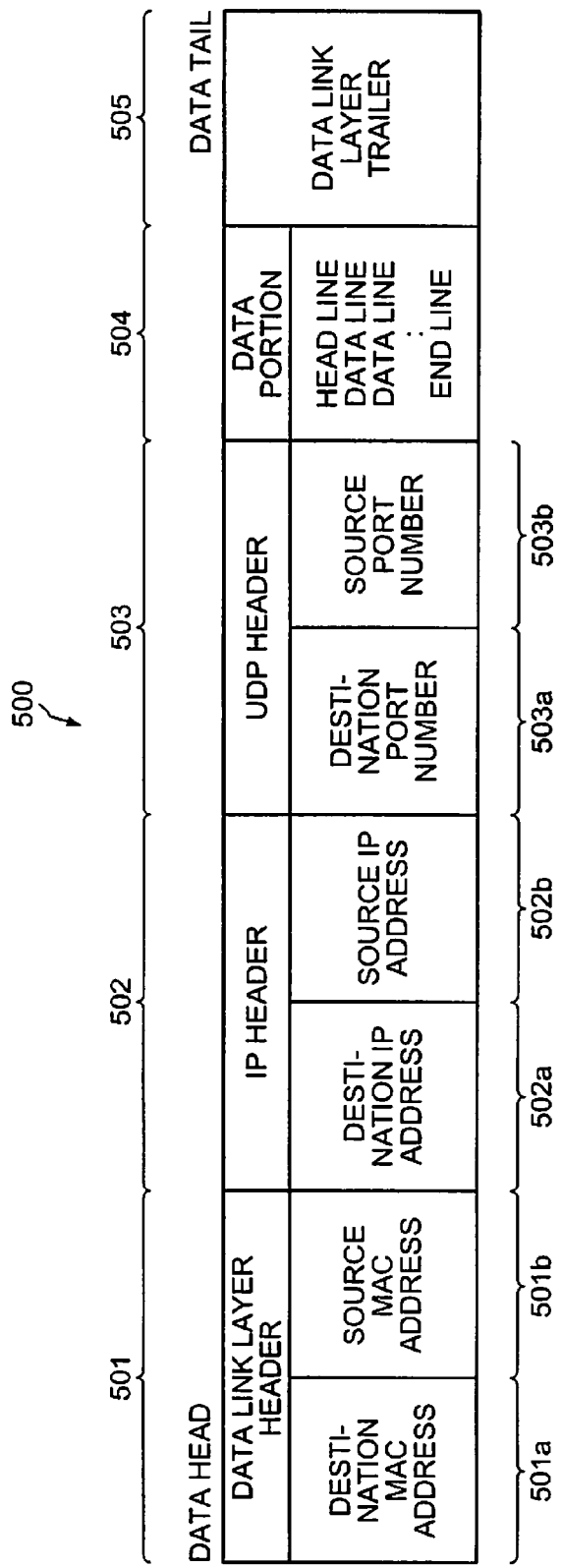

FIG.5C

APPARATUS LIST:

[SEARCH] [SETTING ACQUISITION] [SETTING CHANGE]

| SERIAL NUMBER | MODEL | ROM VERSION | IP ADDRESS | HOST NAME |
|---|---|---|---|---|
| 101000003 | POS PRINTER | VER1.0 | 192.168.0.20 | NOT SPECIFIED |
| 101000001 | POS PRINTER | VER1.0 | 192.168.0.20 | NOT SPECIFIED |
| 101000002 | POS PRINTER | VER1.0 | 192.168.0.20 | NOT SPECIFIED |
| 101000003 | POS PRINTER | VER1.0 | 192.168.0.20 | NOT SPECIFIED |
| 101000004 | POS PRINTER | VER1.0 | 192.168.0.20 | NOT SPECIFIED |
| 101000005 | POS PRINTER | VER1.0 | 192.168.0.20 | NOT SPECIFIED |
| 101000006 | POS PRINTER | VER1.0 | 192.168.0.20 | NOT SPECIFIED |
| 101000007 | POS PRINTER | VER1.0 | 192.168.0.20 | NOT SPECIFIED |

DETAILS OF SETTINGS:

SERIAL NUMBER: 101000003
MODEL: POS PRINTER
ROM VERSION: VER1.0
MAC ADDRESS: 000DAC000003
IP ADDRESS: 192.168.0.20
SUBNET MASK: 255.255.255.0
DEFAULT GATEWAY: 192.168.0.1
HOST NAME: NOT SPECIFIED
DHCP: USED
LINE SPEED: AUTOMATICALLY DETERMINED
PRINT DENSITY: 100%
PRINT SPEED: LEVEL 5

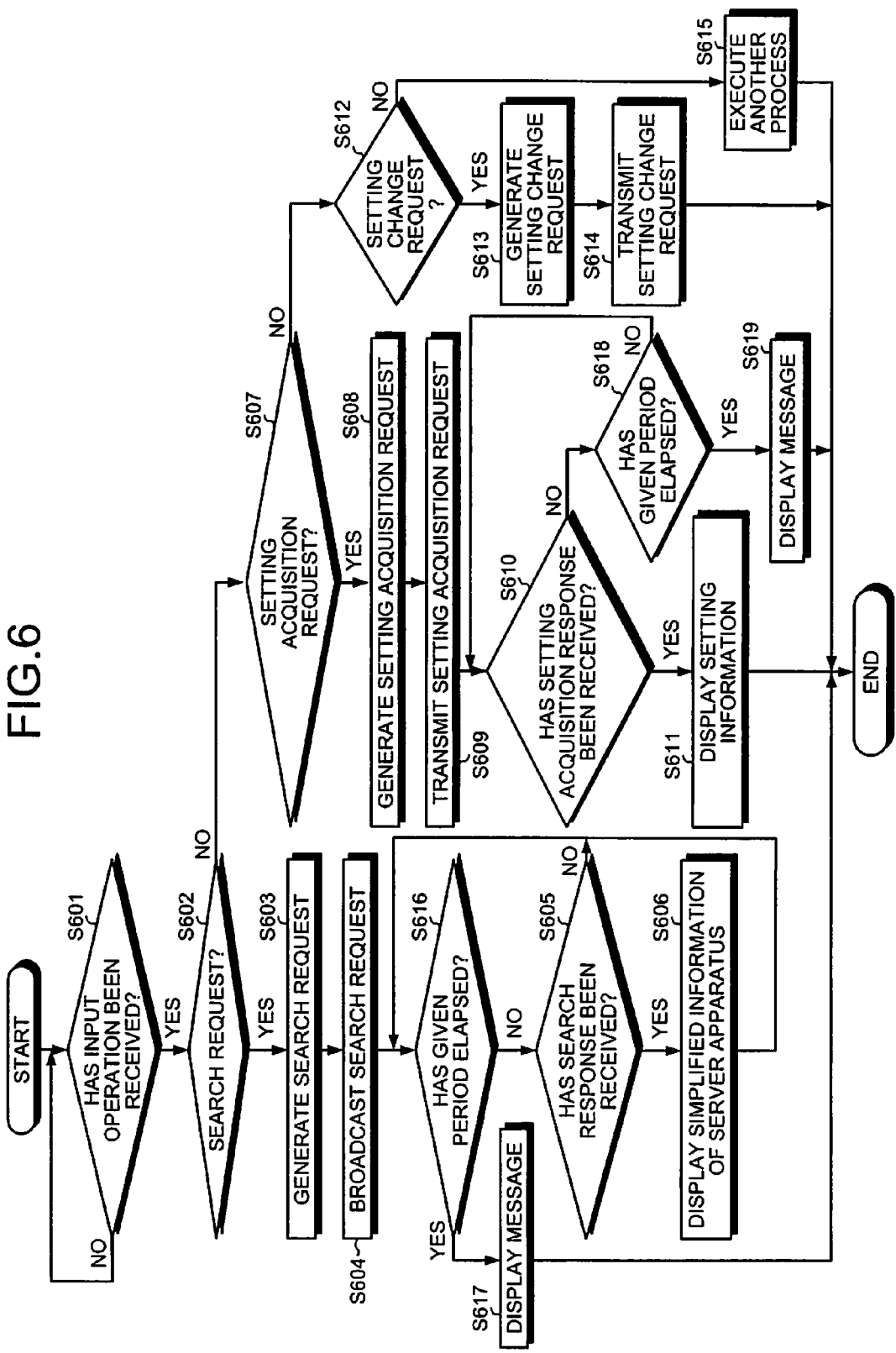

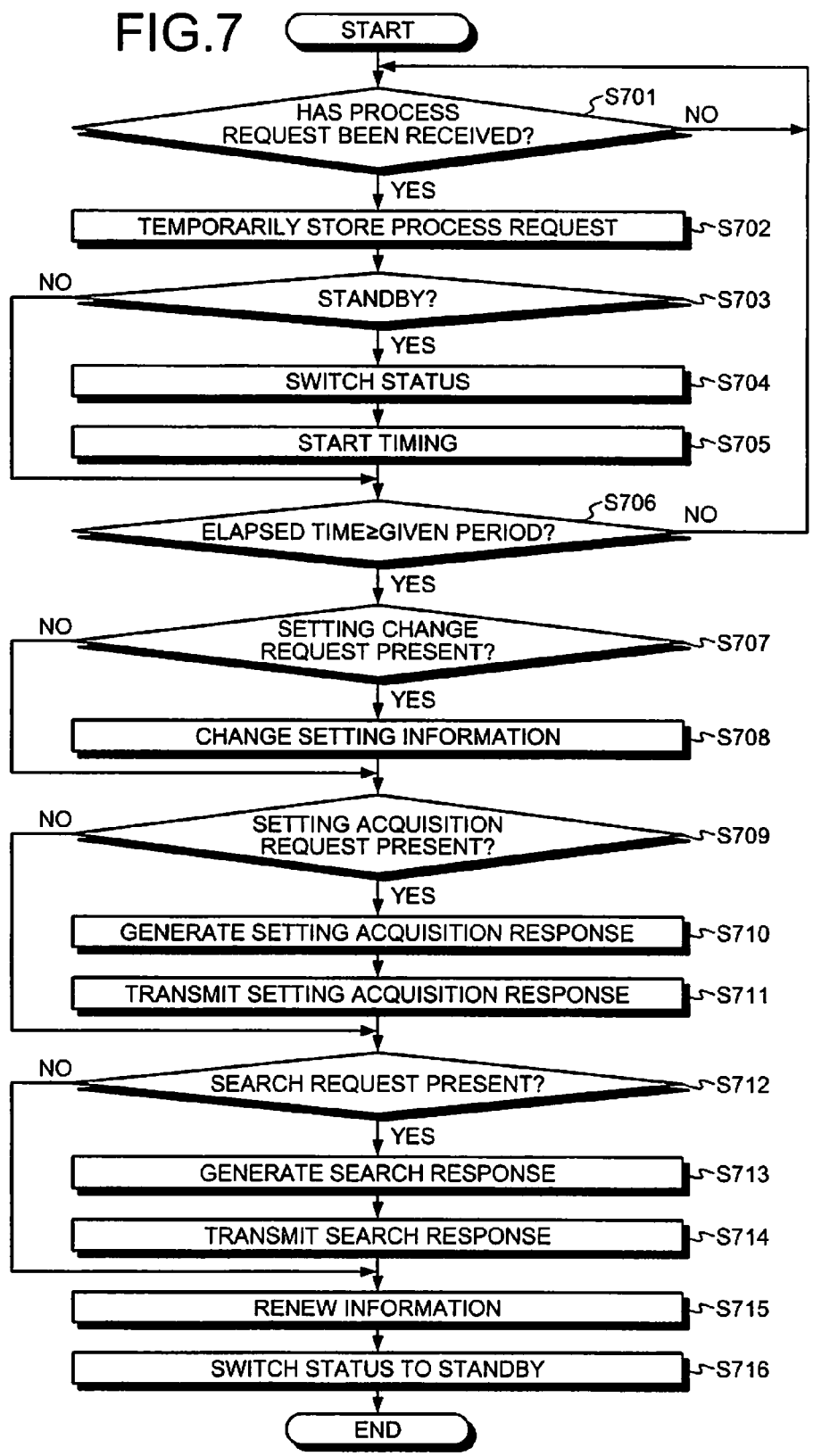

SERVER APPARATUS AND INFORMATION PROCESSING METHOD

CROSS REFERENCE TO RELATED APPLICATIONS

The present application claims the benefit of priority of Japanese Application No. 2011-076793, filed Mar. 30, 2011, now pending, the entire contents of which are incorporated herein by reference.

BACKGROUND OF THE INVENTION

1. Field of the Invention

The present invention relates to a server apparatus for which setting information can be changed through an input operation from a client apparatus connected to a network and an information processing method used by the server apparatus.

2. Description of the Related Art

Conventionally, for example, client apparatuses such as personal computers are connected to a network of server apparatuses, such as printer apparatuses, that are connected by LAN cables; and processing at a server apparatus is executed in response to a processing request transmitted from one of the client apparatuses.

Specifically, for example, a setting change request that requests the changing of server apparatus setting information is transmitted as a processing request, from a client apparatus and the server apparatus that receives the setting change request changes the setting information thereof based on the received setting change request. If a client apparatus connected through the network is to change the setting information of each server apparatus, the assignment of a unique IP address to each server apparatus is necessary to identify each of the server apparatuses.

For example, if a dynamic host configuration protocol (DHCP) server is on the network, an IP address can be assigned to each of the server apparatuses via the network, by using the DHCP server. On the other hand, if no DHCP server is on the network, the operator has to perform the task of assigning an IP address to each of the server apparatuses.

The task of assigning an IP address to each of the server apparatuses when no DHCP server is on the network is troublesome and complicated. Therefore, according to a conventional technology, for example, in a network of client apparatuses and server apparatuses connected by a TCP/IP network, where each server apparatus has an I/F card for connecting to the TCP/IP network, a client apparatus that wants to set an IP address for a printer apparatus broadcasts on the TCP/IP network, a setting packet that includes the address of the I/F card of the targeted printer apparatus. Each server apparatus receives the broadcasted setting packet and if the address of the I/F card included in the received setting packet coincides with the address of the I/F card of the server apparatus, the server apparatus changes the settings thereof according to the setting packet (see, for example, Japanese Patent No. 3645401).

Further, for example, according to a conventional technology, a client apparatus transmits a search request to multiple servers on a network; receives search response from server apparatuses that have received the search request; transmits to a server apparatus selected from among the server apparatuses that transmitted a search response, an address setting request that includes address information concerning the apparatus to be set; and receives from the server apparatus that has received the address setting request, an address setting response that includes address information for the server apparatus (see, for example, Japanese Patent Application Laid-Open Publication No. 2010-98640).

Further, for example, according to a conventional technology, when a request is received that is for the reading out of setting information and broadcasted by a client apparatus, setting information that includes a media access control (MAC) address, an IP address, and a machine name preliminarily set for each server apparatus is read out and if the setting information has not been set, setting information indicating the read out machine name to be identical to the read out MAC address is broadcasted in return. If the machine name of the returned setting information coincides with the MAC address, it is clear at the client server that the setting information of the server apparatus that gave this response has not been set and setting changes are performed for only the server apparatus for which setting information has not been set (see, for example, Japanese Patent No. 4030865).

Conventionally, each time a request transmitted from a client server is received, the received request is stored to a nonvolatile recording medium such as an electrically erasable programmable read-only memory (EEPROM) and processing corresponding to the received request is successively executed. On the nonvolatile recording medium, information related to the request previously received is overwritten by information related to the newest request.

When receiving substantially simultaneously multiple requests respectively transmitted from multiple client apparatuses, such a conventional server apparatus updates the nonvolatile recording medium and executes processing corresponding to the received requests, upon receiving each request. For example, when requests for the changing of setting information are received substantially simultaneously, in the conventional server apparatus, only the setting information based on the newest request (temporally, the latest received request) is valid.

However, with the conventional technologies above, a problem arises in that when the same processing request is received by the server apparatus, from multiple client apparatuses during the timing of a given period, despite the processing corresponding to the same process request previously received becoming invalid, the processing is executed each time the processing request is received and consequently, the processing load of the server apparatus, consequent to the processing request increases.

Further, if the processing requests received substantially simultaneously are requests from the client apparatus that transmitted the processing request, for transmission of response information, irrespective of the transmitted information being the same, the response information is transmitted each time the processing request is received from the client apparatus and therefore, the processing load of the server apparatus, consequent to the processing according to the processing request increases.

Furthermore, if the processing requests received substantially simultaneously are requests from the client apparatus that transmitted the processing request, for transmission of response information, irrespective of the transmitted information being the same, the response information is transmitted each time the processing request is received from the client apparatus and therefore, traffic on the network increases, raising concern of traffic related trouble occurring on the network. Specifically, for example, a problem arises in that there is concern that delays in the transmission and reception of data at the client apparatuses and server apparatuses configuring the network may occur consequent to increased traffic.

In the conventional technologies, when multiple requests are received substantially simultaneous, only the execution result based on the newest request is valid, however, irrespective of previously received requests becoming invalid, the contents of the nonvolatile recording medium are changed (overwritten) each time a request is received. In other words, with the conventional technologies above, a problem arises in that deterioration of the nonvolatile recording medium is promoted consequent to information related to invalid requests also being recorded to the nonvolatile recording medium.

To solve the problems of the conventional technologies above, an object of the present invention is to provide a server apparatus and information processing method that can reduce the processing load on the server apparatus, consequent to processing in response to a processing request and that can suppress increases in traffic on the network.

Further, to solve the problems of the conventional technologies above, an object of the present invention is to provide a sever apparatus and information processing method that can suppress the deterioration of the nonvolatile recording medium.

SUMMARY OF THE INVENTION

A server apparatus according to one aspect of the present invention is connected to a client apparatus, via a network. The server apparatus includes a process request receiving unit that receives a process request transmitted from the client apparatus; a temporary storing unit that each time a process request is received by the process request receiving unit, stores therein for a given time interval, the received process request; a status determining unit that when a process request is received by the process request receiving unit, determines whether status of the server apparatus is standby; a timing unit that when the status is determined by the status determining unit to be standby, switches the status to a state of receiving a request and measures the time that elapses after the status is switched to the state of receiving a request; an elapsed time determining unit that based on the elapsed time measured by the timing unit, determines whether the elapsed time has reached a given period; and a request executing unit that when the elapsed time is determined by the elapsed time determining unit to have reached the given period, executes a process that corresponds to the process request stored in the temporary storing unit.

BRIEF DESCRIPTION OF THE DRAWINGS

FIG. 2 is a block diagram of a hardware configuration of a computer apparatus that implements a client apparatus in the network system according to the embodiment of the present invention;

FIG. 3 is a block diagram of a hardware configuration of a printer apparatus that implements the server apparatus in the network system according to the embodiment of the present invention;

FIG. 4A is a diagram (part 1) depicting an example of a packet format transmitted and received by the apparatuses configuring the network system according to the embodiment of the present invention;

FIG. 4B is a diagram (part 2) depicting an example of a packet format transmitted and received by the apparatuses configuring the network system according to the embodiment of the present invention;

FIG. 4C is a diagram (part 3) depicting an example of a packet format transmitted and received by the apparatuses configuring the network system according to the embodiment of the present invention;

FIG. 5A is a block diagram of a functional configuration of each of the apparatuses configuring the network system according to the embodiment of the present invention;

FIG. 5B is a diagram schematically depicting the packet format of a UDP packet;

FIG. 5C is a diagram of an example of a display screen;

FIG. 6 is a flowchart (part 1) of a process procedure performed by the apparatuses configuring the network system according to the embodiment of the present invention; and FIG. 7 is a flowchart (part 2) of a process procedure performed by the apparatuses configuring the network system according to the embodiment of the present invention.

DETAILED DESCRIPTION OF THE PREFERRED EMBODIMENTS

Figure 1:
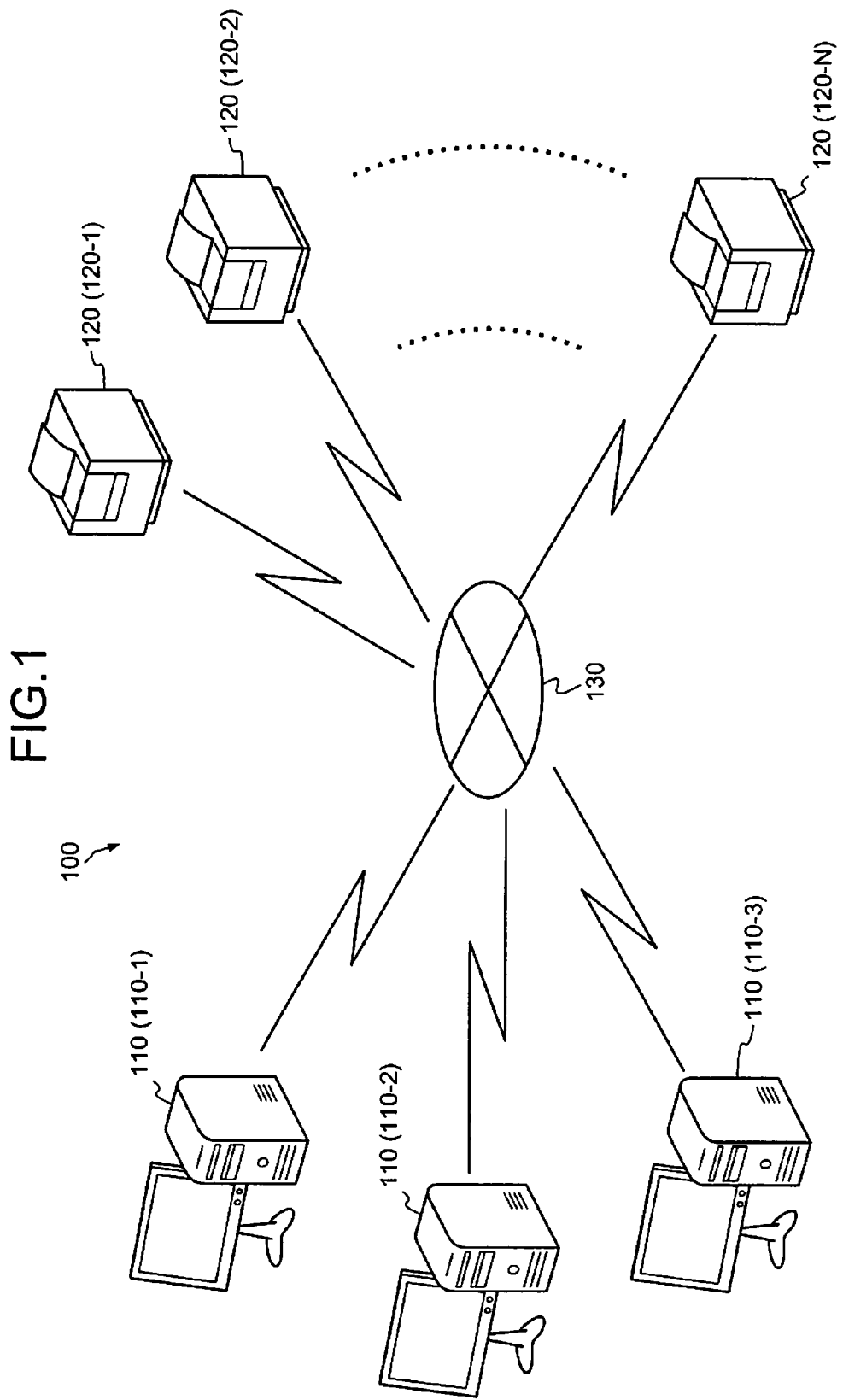
FIG. 1 is a diagram depicting a configuration of a network system that includes a server apparatus according to an embodiment of the present invention.

Referring to the accompanying drawings, exemplary embodiments according to the present invention are explained in detail below.

(Configuration of Network System)

First, configuration of a network system that includes a server apparatus according to an embodiment of the present invention will be described. FIG. 1 is a diagram depicting a configuration of a network system that includes the server apparatus according to an embodiment of the present invention.

In FIG. 1, a network system 100 according to an embodiment of the present invention includes a client apparatus 110 and a server apparatus 120. In the network system 100, the client apparatus 110 and the server apparatus 120 are connected through a network 130.

In the network system 100, the client apparatus 110 is provided in plural (in the present embodiment, 3 are provided). However, in the network system 100, a single client apparatus 110 may be provided. The client apparatus 110 can be implemented by, for example, a computer apparatus such as a personal computer (see FIG. 2).

Further, in the network system 100, the server apparatus 120 is provided in plural (in the present embodiment, N are provided, where N is an arbitrary natural number). In the network system 100 according to the embodiment of the present invention, the number of server apparatuses 120 may be greater than the number of client apparatuses 110. The server apparatus 120, for example, can be implemented by a printer apparatus that communicates with a client apparatus 110 and based on print data transmitted from the client apparatus 110, executes print operations (see FIG. 3).

(Hardware Configuration of Computer Apparatus)

Next, a hardware configuration of a computer apparatus that implements the client apparatus 110 in the network system 100 according to the embodiment of the present invention will be described. FIG. 2 is a block diagram of a hardware configuration of a computer apparatus that implements the client apparatus 110 in the network system 100 according to the embodiment of the present invention.

In FIG. 2, the computer apparatus includes a CPU 201, a ROM 202, a RAM 203, a hard disk drive (HDD) 204, a hard disk (HD) 205, a floppy (registered trade name) disk drive (FDD) 206, a floppy disk (FD) 207 as one example of a removable recording medium, a display 208, an input device 209, and a network interface (I/F) 210. The components 201 to 210 of the computer apparatus are respectively connected by a bus 211.

The CPU 201 governs overall control of the computer apparatus. The ROM 202 stores therein programs such as a boot program. The RAM 203 is used as a work area of the CPU 201. The HDD 204, under the control of the CPU 201, controls the reading and writing of data with respect to the HD 205. The HD 205 stores data written thereto under the control of the HDD 204.

The FDD 206, under the control of the CPU 201, controls the reading and writing of data with respect to the FD 207. The FD 207 stores data written thereto under the control of the FDD 206. Aside from the FD 207, a CD-ROM (CD-RW), MO, digital versatile disk (DVD), etc. may be used as a removable recording medium.

The display 208 can be implemented by, for example, a display apparatus that includes a liquid crystal panel. The liquid crystal panel implementing the display 208 displays various types of text, images, etc. Specifically, for example, the liquid crystal panel displays various types of icons and application screens that are initiated by a selection of an icon.

The input device 209, for example, receives from a user, input of setting information that can be set independently for each server apparatus 120. The CPU 201 performs information processing according to the input received by the input device 209. The input device 209 can be implemented by, for example, a keyboard, a mouse, etc.

The network I/F 210 is connected to the network 130 through a communication line and is further connected to external apparatuses, such as a client terminal apparatus, through the network 130. The network I/F 210 governs an interface between the network 130 and the client apparatus 110 and further controls the input and output of data to/from the computer apparatus.

(Hardware Configuration of Printer Apparatus)

Next, a hardware configuration of a printer apparatus that implements the server apparatus 120 in the network system 100 according to the embodiment of the present invention will be described. FIG. 3 is a block diagram of a hardware configuration of a printer apparatus that implements the server apparatus 120 in the network system 100 according to the embodiment of the present invention.

In FIG. 3, the printer apparatus includes a CPU 301, a ROM 302, a RAM 303, a memory 304, a network I/F 305, a print head 306, motors 307, 308, a display 309, an operation unit 310, and various sensors 311. The components 301 to 311 of the printer apparatus are respectively connected by a bus 312.

The CPU 301 governs overall control of the printer apparatus. The ROM 302 stores therein information related to programs such as a boot program, an application program, etc. The RAM 303 is used as a work area of the CPU 301. The memory 304 is implemented by a nonvolatile recording medium and stores therein setting information of the printer apparatus.

Setting information, for example, indicates the serial number, the model, the version of the memory such as the ROM, the MAC address, the IP address, the subnet mask, the default gateway IP address, the host name, dynamic host configuration protocol (DHCP) use/non-use, the type of line speed, the print density, the print speed, etc. of the server apparatus 120 having setting information that is to be set (changed).

Further, the setting information, for example, may include information indicating the types of recording media that can be used by the printer apparatus (paper type), the number of developable colors of the recording media, etc. Additionally, the setting information may include, for example, information indicating whether to operate, according to print length, a cutter mechanism of the printer apparatus (whether to activate or disable an automatic cutting operation for the paper).

Further, the setting information may include, for example, information indicating the print width of recording media that can be used by the printer apparatus.

The setting information may further include, for example, information indicating whether to enable or disable functions of the printer apparatus, such as an out-of-paper sensor, paper feeding at the startup of the printer apparatus, buzzer alarms, etc. If a buzzer alarm is to be enabled, the setting information may indicate the tone of the buzzer sound used for the alarm. In this case, specifically, for example, the buzzer tone can be set by selecting an arbitrary tone from among various types of preliminarily set buzzer tones such as "tone 1", "tone 2", "tone 3", "tone 4", etc.

The setting information may include, for example, information indicating a code page of characters used in the printer apparatus. A code page is implemented by numerals for specifying a given set of encoded characters or a set of encoded characters specified by the numerals. Each of the code pages (set of encoded characters) are indicated in the form of, for example, "code page XX (XX is a 2 to 5-digit numeral)".

Further, the setting information may include, for example, information indicating whether any international characters are used. International characters, specifically, for example, are characters that can be used in the country (region) such as "America", "France", "Germany", "England", "Denmark", "Japan", "Korea", "China", etc. where the printer apparatus is installed.

The setting information may include, for example, information indicating whether kanji printing in the printer apparatus is enabled or disabled. Information indicating the display language (LCD display language) of the display 309 may be included. The display language of the display 309 specifically, for example, represents "English", "French", "German", "Italian", "Spanish", "Japanese", "Chinese", etc. Further, the setting information may indicate whether the display direction (LCD display direction) on the display 309 is upright or inverted.

The setting information may include, for example, information indicating whether to automatically turn off (non-display) the display 309 when the printer apparatus is in a standby state and if the display 309 is to be automatically turned off (non-display), further indicating the period from when the printer apparatus enters the standby state until the display 309 is automatically turned off (non-display).

The period from when the printer apparatus enters the standby state until the display 309 is automatically turned off (non-display) can be arbitrarily set, for example, as "after 30 seconds", "after 5 minutes", etc. The setting information may further include information indicating whether direct operation of the printer apparatus by operation keys provided on the printer apparatus is enabled or disabled.

The memory 304 storing the setting information is implemented by a nonvolatile recording medium. Consequently, even if the power of the printer apparatus is turned off, the setting information can be stored. Specifically, the memory 304 can be implemented by, for example, a nonvolatile recording medium such as EEPROM.

The network I/F 305 is connected, via the network 130, to a computer apparatus implementing the client apparatus 110, governs an interface between the printer apparatus and the computer apparatus, and controls the input and output of data to/from the printer apparatus. Specifically, the printer apparatus, for example, receives through the network I/F 305, print data from the computer apparatus implementing the client apparatus 110, and performs printing operations consequent to the control of components by the CPU 301, based on the received print data.

The print head 306 is driven under the control of the CPU 301 and prints to a recording medium such as long-shaped paper, information that is based on print data. The print head 306 can be implemented, for example, by a thermal print head having heating elements arranged linearly. The print head 306 is driven under the control of the CPU 301, whereby the linearly arranged heating elements are selectively energized causing the heating elements to be selectively heated.

The printer apparatus includes a platen that is omitted from the drawing and disposed to oppose the linearly arranged heating elements in the print head 306, with the recording medium conveyance path therebetween. With a recording medium having a thermal color developing property such as thermal sensitive paper situated between the print head 306 and the platen, the printer apparatus develops a small point (dot) of color on the paper by selectively energizing the heating elements of the print head 306 to selectively heat the heating elements.

The print head 306 is not limited to a thermal head and may be a print head that employs a non-impact scheme similar to the thermal scheme. As non-impact schemes, the print head 306 may perform printing by, for example, a thermal transfer scheme, an inkjet scheme, a laser scheme, etc. In this case, in place of the thermal scheme, the print head 306 includes a print head according to the printing scheme. The printing methods of the thermal transfer scheme, the inkjet scheme, and the laser (electrophotographic) scheme are commonly known technologies and therefore, are omitted from the description.

The print head 306 is not limited to a print head that employs a non-impact scheme to perform printing and may be a print head that employs an impact scheme that uses a dot impact print head to perform printing. Specifically, the print head 306, for example, may be a print head that performs printing that employs an impact scheme such as a wire dot printer, etc.

The motor 307 is driven under the control of the CPU 301 and generates a driving force that rotates a conveyance roller, which is omitted from the drawing. The motor 307 is driven under the control of the CPU 301 and rotates the conveyance roller according to the energizing timing of the print head 306. As a result, small points (dots) can be successively developed on the recording medium, enabling characters, etc. to be printed on the recording medium. The printing is not limited to the expression of characters by the developed small points (dots) and may include the expression of non-characters such as figures.

The motor 308 is driven under the control of the CPU 301 and generates a driving force that operates a movable blade in the cutter mechanism, which is omitted from the drawing. The cutter mechanism includes a fixed blade whose position is fixed in the printer apparatus and the movable blade that is movable with respect to the fixed blade. With the recording medium positioned between the fixed blade and the movable blade, the cutter mechanism cuts the recording medium at an arbitrary position by moving the movable blade with respect to the fixed blade.

The display 309 displays information such as characters and symbols under the control of the CPU 301. Specifically, for example, when an error occurs in the printer apparatus or when the remaining amount of recording medium falls below a given amount, the display 309 displays text information indicating such a state. The operation unit 310 has multiple operation keys and the CPU 301 detects a signal generated according to the manipulated keys of the operation unit 310 and performs given processing.

The printer apparatus includes various sensors 311 such as a sensor that detects a position (leading edge position) of the recording medium, a sensor that detects the remaining amount of the recording medium, etc. The various sensors 311, for example, include a light emitting element and a light receiving element that receives the light emitted by the light emitting element and can be implemented by an optoelectronic sensor that detects the position (leading edge position) of the recording medium, the remaining amount of recording medium, etc., based on changes in the amount of light received at the light receiving element.

(Packet Format Example)

Next, an example will be described of a packet format transmitted and received by the apparatuses configuring the network system 100 according to the embodiment of the present invention. FIG. 4A, FIG. 4B, and FIG. 4C are diagrams depicting an example of a packet format transmitted and received by the apparatuses configuring the network system 100 according to the embodiment of the present invention.

FIG. 4A depicts a basic configuration of the packet format transmitted and received by the apparatuses 110, 120 configuring the network system 100 according to the embodiment of the present invention. In FIG. 4A, the packet format has a basic configuration that sequentially combines from the head to the tail of the packet, a header line that includes an identification information portion, a communication direction portion, and a command number portion; a data line that includes server-apparatus-specific setting information; and an end line that indicates the tail of the packet.

The identification information portion is configured by information that can uniquely identify the manufacturer, model information, etc. of the server apparatus 120 (printer apparatus). The communication direction portion indicates the communication direction of information output on the network. The communication direction portion, for example, indicates that the direction of communication is from the client apparatus 110 side toward the server apparatus 120 side, i.e., in a 0x00 direction. Further, the communication direction portion, for example, indicates that the direction of communication is from the server apparatus 120 side toward the client apparatus 110, i.e., in a 0x FF direction. The command number portion regards the head byte as the lowermost byte, has an information amount of, for example, 4-binary bytes, and indicates the packet type.

The data line includes the server-apparatus-specific setting information and the number of the data lines (data amount) is variable. The data line, for example, is expressed as "(data identification character string)"+"(Space)=(Space)"+"(data character string)"+"\r\n". The data line is basically configured by text data. The length of data in the data line is dependent on the data identification character string. The end line indicates the tail of the data and for example, is expressed as "END(Space)=(Space)\r\n". The end line of the packet, for example, has an information amount of 8 bytes.

FIG. 4B depicts a packet for search response (search response packet) that is transmitted by the server apparatus 120 configuring the network system 100 according to the embodiment of the present invention. In FIG. 4B, following the packet format above, a search response has a configuration that sequentially combines from the head to the tail of the packet, the header line that includes the identification information portion, the communication direction portion, and the command number portion; the data line that includes the server-apparatus-specific setting information; and the end line that indicates the tail of the packet.

The data line in the search response includes the model, the ROM version, the serial number, the IP address, and the host name. The data line in the search response and indicating the model can be configured by, for example, "DEV=" and "IF1-ET01" and "\r\n" indicating the end of the data line. In the data line, "DEV=" is 6-byte information, "IF1-ET01" is 16-byte information, and "\r\n" is 2-byte information.

In the search response, the data line indicating the ROM version can be configured by, for example, "VER=" and "DQ00-01XX" and "\r\n" indicating the end of the data line. In the data line, "VER=" is 6-byte information, "DQ00-01XX" is 16-byte information, and "\r\n" is 2-byte information.

In the search response, the data line indicating the serial number can be configured by, for example, "SERILAL_NUM=" and "10100033" and "\r\n" indicating the end of the data line. In the data line, "SERILAL_NUM=" is 13-byte information, "10100033" is 16-byte information, and "\r\n" is 2-byte information.

In the search response, the data line indicating the IP address can be configured by, for example, "IP=" and "169.254.1.10" and "\r\n" indicating the end of the data line. In the data line, "IP=" is 5-byte, "169.254.1.10" is 15-byte information and "\r\n" is 2-byte information.

In the search response, the data line indicating the host name can be configured by, for example, "HOST_NAME=" and "Cash desk01", and "\r\n" indicating the end of the data line. In the data line, "HOST_NAME=" is 12-byte information, "Cash desk01" is 32-byte information, and "\r\n" is 2-byte information.

The search response depicted in FIG. 4B has an information amount of 168 bytes. Fewer data lines may be included in the search response or only the data line indicating the serial number may be included. In this manner, the search response is configured by the least amount of information for identifying the server apparatus 120, enabling the data size of the search response to be reduced. By compressing the data of the search response, the data size of the search response output on the network 130 can be further reduced.

FIG. 4C depicts a packet for setting acquisition response (setting acquisition response packet) transmitted by the server apparatus 120 configuring the network system 100 according to the embodiment of the present invention. In FIG. 4C, following the packet format above, the setting acquisition response has a configuration that sequentially combines from the head to the tail of the packet, the header line that includes the identification information portion, the communication direction portion, and the command number portion; the data line that includes the server-apparatus-specific setting information, and the end line that indicates the tail of the packet.

The data line packet in the setting acquisition response includes information indicating the model, the ROM version, the MAC address, the line speed, and whether DHCP is valid; information indicating the IP address, the subnet mask, the default gateway IP address, the IP address at initialization, setting information related to simple network management protocol (SNMP), the print port, the timeout period when print data is received, the name of the manufacturer, the host name, and the serial number of the printer apparatus implementing the server apparatus 120. The setting acquisition response depicted in FIG. 4C has an information amount of 537 bytes.

In comparing the search response depicted in FIG. 4B and the setting acquisition response depicted in FIG. 4C, the information amount of the setting acquisition response is greater than the information amount of the search response. In other words, at the point when the search response is transmitted, since the least amount of necessary information for the server apparatus 120 search is assumed, increases in traffic on the network can be suppressed. In the present embodiment, although the amount of information of the setting acquisition response is approximately 3 times the information amount of the search response, the information amount of the setting acquisition is not limited and for example, may be 100 times the information amount of the search response.

(Functional Configuration of Network System 100)

Next, a functional configuration of each of the apparatuses configuring the network system 100 according to the embodiment of the present invention will be described. FIG. 5A is a block diagram of a functional configuration of each of the apparatuses configuring the network system 100 according to the embodiment of the present invention.

(Functional Configuration of Client Apparatus 110)

First, a functional configuration of the client apparatus 110 configuring the network system 100 according to the embodiment of the present invention will be described. In FIG. 5A, functions of the client apparatus 110 according to the embodiment of the present invention include an input-operation receiving unit 511, a process request transmitting unit 512, a response information receiving unit 513, and a display unit 514. The input-operation receiving unit 511, the process request transmitting unit 512, the response information receiving unit 513, and the display unit 514 implementing the functions of the client apparatus 110 according to the embodiment of the present invention can be implemented by components of the computer apparatus implementing the client apparatus 110.

The input-operation receiving unit 511 receives input operations performed by the user of the client apparatus 110. The input-operation receiving unit 511 receives an input operation that transmits to a server apparatus 120, a process request requesting the server apparatus 120 to execute a process. Specifically, the input-operation receiving unit 511, for example, receives an input operation instructing the broadcasting of a search request that requests each server apparatus 120 connected to the network 130, to transmit identification information thereof.

Specifically, the input-operation receiving unit 511, for example, receives an input operation instructing the transmission of a setting acquisition request to the server apparatuses, the setting acquisition request requesting acquisition of the setting information of the server apparatus 120. Specifically, the input-operation receiving unit 511, for example, receives an input operation instructing the transmission of a setting change request to the setting server apparatuses 120, the setting change request requesting the server apparatus 120 to change the setting information thereof.

When an input operation for a process request is received by the input-operation receiving unit 511, the process request transmitting unit 512 transmits the process request to the server apparatus 120. Specifically, when the input-operation receiving unit 511 receives an input operation for a process request that instructs the broadcasting of a search request, the process request transmitting unit 512, for example, broadcasts the search request to the server apparatuses 120 connected to the network 130. In the network system 130 according to the embodiment of the present invention, the transmission and reception of requests and responses between a client apparatus 110 and a server apparatus 120 can be implemented, for example, by a user datagram protocol (UDP) broadcast.

When the input-operation receiving unit 511 receives an input operation instructing the broadcasting of a search request, the process request transmitting unit 512 transmits to any number of server apparatuses 120 on the network system 100, a search request having a broadcast address set as all of the server apparatuses configuring the network system 100. The search request transmitting unit 512 does not designate multiple counterparts and multicast the search request, but rather broadcasts the search request.

Herein, a packet format of a general UDP packet will be described. FIG. 5B is a diagram schematically depicting the packet format of a UDP packet. In FIG. 5B, a general UDP packet 500 is configured as a MAC frame at a data link layer in an open systems interconnection (OSI) reference model.

The MAC frame that includes the UDP packet 500 includes a data link layer header 501, an IP header 502, a UDP header 503, a data portion 504, and a data link layer trailer 505. The data link layer header 501 includes communication control information for controlling communication that does not cross the router and is within the same network, and is further configured by a destination MAC address 501*a*, a source MAC address 501*b*, and other non-depicted communication control information.

The IP header 502 performs host identification by address, includes communication control information for enabling inter-host connections over routers irrespective of the LAN or WAN, and is further configured by a destination IP address 502*a*, a source IP address 502*b*, and other non-depicted communication control information. The UDP header 503 includes a host number for identifying applications at the hosts on both ends of communication and is configured by a destination port number 503*a*, a source port number 503*b*, and other control information.

The data portion 504 is configured by the main body of a request or a response transmitted by a UDP broadcast and has a configuration that sequentially combines from the head to the tail, the header line that includes the identification information portion, the communication direction portion, and the command number portion, the data line that includes setting information specific to the server apparatus 120, and the end line that indicates the end of the packet. The data link layer trailer 505 is located at the tail of the MAC frame and includes non-depicted error information indicating the occurrence of errors during transmission. The OSI reference model, the LAN, the WAN, the headers, and the other communication control information are commonly known technologies and therefore, description thereof is omitted.

Specifically, the process request transmitting unit 512, for example, transmits a search request whose destination MAC address 501*a* of the data link layer header 501 depicted in FIG. 5B is set to "FF:FF:FF:FF:FF:FF" as the broadcast address. Specifically, the process request transmitting unit 512, for example, transmits a search request whose destination IP address 502*a* of the IP header 502 in FIG. 5B is set to "255.255.255.255" as the broadcast address.

Specifically, the process request transmitting unit 512, for example, may be a unit that transmits a search request for which each host unit bit has been set to 1 as a broadcast address. In this case, more specifically, for example, if the network address is "192.168.0.0" and the host address is the lower 8 bits, the process request transmitting unit 512 transmits a search request for which "192.168.0.255" is set as the broadcast address.

In the search request transmitted by the search request transmitting unit 512, the number to which the destination port 503*a* and the source port 503*b* of the UDP header 503 in FIG. 5B is set is not particularly limited. For the destination port number 503*a* and the source port number 503*b* of the UDP header 503 in FIG. 5B, specifically, the search request transmitting unit 512, for example, preferably uses (sets) a number (1024 to 65535) outside the range of the well known port numbers (0 to 1023) assigned by the Internet Assigned Numbers Authority (IRNA).

Specifically, when a server apparatus 120 has been selected and a given input operation is received, the process request transmitting unit 512, for example, transmits to the selected server apparatus 120, a setting acquisition request that includes identification information (e.g., the serial number) of the server apparatus 120. The server apparatus 120 selection can be performed, for example, by performing a given input operation on a given display screen (see FIG. 5C) displayed on the display 208 of the computer apparatus implementing the client apparatus 110.

FIG. 5C is a diagram of an example of a display screen. In FIG. 5C, an example is depicted of a display screen that is displayed on the display 208 of the computer apparatus implementing the client apparatus 110, when the client apparatus 110 searches for a server apparatus 120 in the factory default state. In FIG. 5C, a display screen 530, substantially at a central portion, displays simplified information that is part of the setting information of the server apparatus that transmitted a search response in response to a search request broadcasted by the client apparatus 110. In the present embodiment, simplified information indicates only the serial number, the model, the ROM version, the IP address, and the host name of the server apparatus 120 and is displayed at a substantially central portion of the display screen 530.

The upper most portion of the display screen 530 shows simplified information of the server apparatus 120 selected in the substantially central portion of the display screen 530. The upper most portion of the display screen 530 updates the displayed contents each time the selected server apparatus 120 in the substantially central portion is changed and shows simplified information related to the selected server apparatus 120 in the substantially central portion. The lower most portion of the display screen 530 displays setting information related to the server apparatus 120 selected from among the server apparatuses 120 shown in the substantially central portion of the display screen 530. The lower most portion of the display screen 530 displays detailed setting information, including the simplified information of the server apparatus 120. The setting information is included in the packet that is depicted in FIG. 4C above and shows the data of a setting acquisition response.

The lower most portion of the display screen 530, as setting information, for example, in addition to the serial number, the model, the ROM version, the IP address, and the host name of the server apparatus 120, displays setting information such as the MAC address, the subnet mask, the default gateway IP address, the DHCP, the line speed, the print density, the print speed, etc. Excluding the serial number and MAC address, server apparatuses 120 of the same model, at the time of factory shipment, have completely identical configurations. The serial number and the MAC address are uniquely set for each apparatus at the factory.

More specifically, for example, with a server apparatus 120 selected in the substantially central portion of the display screen 530, when the process request transmitting unit 512 receives, by a manipulation of a "setting acquisition" key displayed in an upper portion of the display screen, an input operation for a process request that is a setting acquisition request requesting transmission of setting information stored in the memory 304 of the selected server apparatus 120, the process request transmitting unit 512 transmits a setting acquisition request that includes server apparatus identification information (e.g., the serial number) of the selected server apparatus 120.

The process request transmitting unit 512 broadcasts to each server apparatus 120 configuring the network 130, the setting acquisition request requesting acquisition of the setting information of the selected server apparatus 120. Further, configuration may be such that the process request transmitting unit 512 transmits the setting acquisition request requesting the acquisition of the setting information of the selected server apparatus 120 to the concerned server apparatus 120 only.

The response information receiving unit 513, as a result of transmission of the process request transmitted by the process request transmitting unit 512, receives response information transmitted from the server apparatus 120 that received the process request. If the response information is broadcasted by the server apparatus 120, the response information receiving unit 513 receives only the response information pertinent thereto.

Specifically, the response information receiving unit 513, for example, as a result of the broadcasting of a search request by the process request transmitting unit 512, receives as response information, a search response transmitted from the server apparatus 120 that received the search request. Specifically, the response information receiving unit 513, for example, as a result of the transmission of a setting acquisition request by the process request transmitting unit 512, receives as response information, a setting acquisition response transmitted from the concerned server apparatus 120.

The display unit 514, based on the response information received by the response information receiving unit 513, displays various display screens. Specifically, for example, when the response information receiving unit 513 has received a search response as response information, based on the search response, the display unit 514 displays a display screen that shows simplified information, which is a part of the setting information of the server apparatus 120 that transmitted the search response in response to the search request broadcasted by the client apparatus 110.

When a search response has been transmitted by multiple server apparatuses 120, the response information receiving unit 513 receives each of the search responses and based on the search responses, the display unit 514 displays a display screen showing simplified information of each of the server apparatuses 120. Specifically, for example, when the response information receiving unit 513 has received as response information, a setting acquisition response, based on the setting acquisition response received by the response information receiving unit 513, the display unit 514 displays in a lower portion of the screen, detailed setting information of the selected server apparatus 120.

(Functional Configuration of Server Apparatus 120)

Next, a functional configuration of the server apparatus 120 configuring the network system 100 according to the embodiment of the present invention will be described. In FIG. 5A, functions of the server apparatus 120 according to the embodiment of the present invention are implemented by a storing unit 521, a process request receiving unit 522, a temporary storing unit 523, a status determining unit 524, a status storing unit 525, a timing unit 526, an elapsed time determining unit 527, a setting-change-request-reception determining unit 528, a setting-acquisition-request-reception determining unit 529, a search-request-reception determining unit 530, and a request executing unit 531.

The storing unit 521, the process request receiving unit 522, the temporary storing unit 523, the status determining unit 524, the status storing unit 525, the timing unit 526, the elapsed time determining unit 527, the setting-change-request-reception determining unit 528, the setting-acquisition-request-reception determining unit 529, the search-request-reception determining unit 530, and the request executing unit 531 implementing the functions of the server apparatus 120 according to the embodiment of the present invention can be implemented by the components of the printer apparatus that implements the server apparatus 120. The storing unit 521 stores setting information that can be set specifically for the server apparatus 120. The storing unit 521 can be implemented by a nonvolatile recording medium that stores the setting information in a nonvolatile manner, irrespective of whether power is supplied.

The process request receiving unit 522 receives process requests transmitted by the client apparatus 110. The process request receiving unit 522, for example, receives as a process request, a search request broadcast by the client apparatus 110. Further, the process request receiving unit 522, for example, receives a setting acquisition request transmitted by the client apparatus 110. For example, when a process request for a given server apparatus 120 has been broadcasted like a setting acquisition request, the process request receiving unit 522 receives only the process request pertinent thereto.

Each time a process request is received by the process request receiving unit 522, the temporary storing unit 523 stores the received process request for a given period. The temporary storing unit 523, for example, can be implemented by a nonvolatile recording medium such as a so-called random access memory (RAM), etc. Use of the RAM allows the data stored to the RAM to be accessed in an arbitrary sequence (random access), thereby enabling high speed reading, writing, and deletion. Further, the temporary storing unit 523, for example, may be implemented by a nonvolatile recording medium such as a so called static random access memory (SRAM), a dynamic random access memory (DRAM), a synchronous DRAM (SDRAM), a double data rate SDRAM (DDR SDRAM), etc.

When a process request has been received by the process request receiving unit 522, the status determining unit 524 determines whether the status of the server apparatus 120 is a state of receiving a request. Whether the status of the server apparatus 120 is the state of receiving a request can be determined, for example, by the value of a variable (e.g., the state of a flag) stored in the status storing unit 525. When the value of the variable stored in the status storing unit 525 indicates standby and a process request is received by the process request receiving unit 522, the status determining unit 524 switches the status to the state of receiving a request.

The status storing unit 525 is a register that holds the determination result for the status of the server apparatus 120 and for example, can be implemented by a circuit that uses a circuit element such as a flip flop and holds data. Further, the status storing unit 525 may be, for example, that which is implemented by a portion of a nonvolatile recording medium residing within a processor and which implements functions of a register, rather than that which implements the functions of the storing unit 525 by a dedicated circuit element.

The timing unit 526 measures the elapsed time from the status of the status storing unit 525 being standby until the status is switched to the state of receiving request. The elapsed time determining unit 527, based on the elapsed time measured by the timing unit 526, determines whether the elapsed time has reached a given period. The given period, for example, can be an arbitrarily set period such as "1 second", "3 seconds", etc.

When the elapsed time determining unit 527 determines that the elapsed time has reached the given period, the setting-change-request-reception determining unit 528 determines whether the process request stored in the temporary storing unit 523 is a setting change request requesting a change of the settable setting information that is specific to the server apparatus 120. When the elapsed time determining unit 527 determines that the elapsed time has reached the given period, the setting-acquisition-request-reception determining unit 529 determines whether the process request stored in the temporary storing unit 523 is a setting acquisition request requesting transmission of the setting information. When the elapsed time determining unit 527 determines that the elapsed time has reached the given period, the search-request-reception determining unit 530 determines whether the process request stored in the temporary storing unit 523 is a search request requesting transmission of identification information of the server apparatus 120.

When the elapsed time determining unit 527 determines that the elapsed time has reached a given period, the request executing unit 531 executes, with respect to the client apparatus 110, a process that corresponds to the process request stored in the temporary storing unit 523. For example, if a process request requesting a response is stored in the temporary storing unit 523, the request executing unit 531 generates response information according to the received process request and transmits the generated response information.

At the transmission of the response information, the request executing unit 531, for example, broadcasts the generated response information to all of the client apparatuses 110 configuring the network 130. Further, configuration may be such that the request executing unit 531, for example, transmits the generated response information to the concerned client apparatus 110 only.

Specifically, for example, if the setting-change-request-reception determining unit 528 determines that the process request stored in the temporary storing unit 523 is a setting change request, the request executing unit 531, based on the setting change request received last among setting change requests stored in the temporary storing unit 523, updates the setting information stored on the nonvolatile recording medium. As a result, if multiple setting change requests respectively transmitted by multiple client apparatuses 110 are received within the given period, the setting information is updated based on the setting change request received last.

Specifically, for example, if the setting-acquisition-request-reception determining unit 529 determines that the process request stored in the temporary storing unit 523 is a setting acquisition request, the request executing unit 531 broadcasts response information (setting acquisition response) that includes the updated setting information. As a result, if multiple setting change requests respectively transmitted by multiple client apparatuses 110 are received within the given period, response information that includes setting information updated based on the setting change request received last (most recently) is transmitted to all of the client apparatuses 110 configuring the network 130. The broadcasted response information (setting acquisition response) is received at the client apparatus 110 that transmitted the setting acquisition request.

A setting acquisition response has a greater data volume than a search response. Specifically, a setting acquisition response, for example, can include in data lines, information indicating the model, the ROM version, the MAC address, the line speed, and whether DHCP is valid; setting information related to the IP address, the subnet mask, the default gateway IP address, the IP address at initialization, and SNMP; and information indicating the print port, the timeout period when print data is received, as well as the manufacturer, the host name, and the serial number of the printer apparatus implementing the server apparatus 120.

Specifically, for example, if the search-request-reception determining unit 530 determines that the process request stored in the temporary storing unit 523 is a search request, the request executing unit 531 broadcasts response information (a search response) that includes the identification information of the server apparatus 120 and that has a data volume that is less than the data volume of response information that includes setting information.

Response information (a search response) that has a data volume that is less than the data volume of response information that includes setting information, for example, can include only the identification information of the server apparatus 120, among the information a data packet of a setting acquisition response above. Specifically, a search response, for example, can be of a configuration that includes the serial number, the model, the ROM version, the IP address, and the host name of the server apparatus 120 as described above.

The request executing unit 531 sets all of the information related to the process requests stored in the temporary storing unit 523 to a state of no reception (a state where no process request is received), upon completing execution of the series of process requests. Further, the status determining unit 524 switches the status stored in the status storing unit 525 to standby.

(Process Procedure of Network System 100)

Next, a process procedure performed by the apparatuses configuring the network system 100 according to the embodiment of the present invention will be described. FIG. 6 and FIG. 7 are flowcharts of a process procedure performed by the apparatuses configuring the network system 100 according to the embodiment of the present invention.

In FIG. 6, a process procedure of the client apparatus 110 configuring the network system 100 according to the embodiment of the present invention is depicted. In the flowchart of FIG. 6, first, the client apparatus 110 determines whether an input operation has been received (step S601). At step S601, if an input operation has not been received (step S601: NO), the client apparatus 110 waits until an input operation is received.

At step S601, when an input operation has been received (step S601: YES), the client apparatus 110 determines whether the input operation at step S601: YES is an input operation instructing transmission of a search request (step S602). As step S602, if input operation at step S601: YES is an input operation instructing transmission of a search request (step S602: YES), the client apparatus 110 generates a search request (step S603), and broadcasts the generated search request (step S604).

Next, the client apparatus 110 determines whether a given period has elapsed since the broadcasting of the search request at step S604 (step S616). The given period, which is a criterion for the determination at step S616, can be arbitrarily set by the user, for example. At step S616, if the given period has not elapsed since the broadcasting of the search request at step S604 (step S616: NO), the client apparatus 110 determines whether a search response from a server apparatus 120 to which the search request was broadcasted at step S604, has been received (step S605).

At step S605, if a search response from a server apparatus 120 to which the search request was broadcasted at step S604, has been received (step S605: YES), the client apparatus displays the simplified information of the server apparatus 120 on the display 208 of the computer apparatus implementing the client apparatus 110 (step S606), and returns to step S616.

On the other hand, at step S605, if a search response (response information) from a server apparatus 120 to which the search request was broadcasted at step S604, is not received (step S605: NO), the client apparatus 110 returns to step S616, and determines whether the given period has elapsed since the broadcasting of the search request at step S604.

At step S616, if the given period has elapsed since the broadcasting of the search request at step S604 (step S616: YES), the client apparatus 110 displays on the display 208 of the computer apparatus implementing the client apparatus 110, a message indicating that a reception interval for receiving a search response has ended (step S617), thereby ending a series of processes.

At step S602, if the input operation received at step S601: YES is not an input operation instructing the transmission of a search request (step S602: NO), the client apparatus 110 determines whether the input operation received at step S601: YES is an input operation instructing the transmission of a setting acquisition request (step S607). If the input operation received at step S601: YES is an input operation instructing the transmission of a setting acquisition request (step S607: YES), the client apparatus generates a setting acquisition request (step S608) and transmits the generated setting acquisition request (step S609).

At step S609, for example, the client apparatus 110 may broadcast the setting acquisition request generated at step S608 to all of the server apparatuses 120 configuring the network 130. Further, at step S609, for example, the client apparatus 110 may transmit the setting acquisition request generated at step S608 to the concerned server apparatus 120 only.

Next, the client apparatus 110 determines whether a setting acquisition response from the server apparatus to which the setting acquisition request was transmitted at step S609, has been received (step S610). At step S610, if a setting acquisition response from the server apparatus 120 to which the setting acquisition request was transmitted at step S609, has been received (step S610: YES), the client apparatus 110 displays on the display 208 of the computer apparatus implementing the client apparatus 110, the setting information of the concerned server apparatus 120 (step S611), thereby ending a series of the processes.

On the other hand, at step S610, if a setting acquisition response (response information) from the server apparatus 120 to which the setting acquisition request was transmitted at step S609, has not been received (step S610: NO), the client apparatus 110 determines whether the given period has elapsed since the transmission of the setting acquisition request at step S609 (step S618). The given period, which is a criterion for the determination at step S618, can be arbitrarily set by the user, for example.

At step S618, if the client apparatus 110 determines that the given period has not elapsed since the transmission of the setting acquisition request at step S609 (step S618: NO), the client apparatus 110 returns to step S610, and determines whether a setting acquisition response (response information) has been received. On the other hand, at step S618, if the client apparatus 110 determines that the given period has elapsed since the transmission of the setting acquisition request at step S609 (step S618: YES), the client apparatus 110 displays on the display 208 of the computer apparatus implementing the client apparatus 110, a message indicating that no setting acquisition response has been received (step S619), thereby ending a series of the processes.

At step S607, if the input operation received at step S601: YES is not an input operation instructing the transmission of a setting acquisition request (step S607: NO), the client apparatus 110 determines whether the input operation received at step S601: YES is an input operation instructing the transmission of a setting change request (step S612). If the input operation received at step S601: YES is an input operation instructing the transmission of a setting change request (step S612: YES), the client apparatus 110 generates a setting change request (step S613), and transmits the generated setting change request (step S614), thereby ending a series of the processes.

At step S614, for example, the client apparatus 110 may broadcast the setting change request generated at step S613 to all of the server apparatuses 120 configuring the network 130. Further, at step S614, for example, the client apparatus 110 may transmit the setting change request generated at step S613 to the concerned server apparatus 120 only.

At step S612, if the input operation received at step S601: YES is not an input operation instructing the transmission of a setting change request (step S612: NO), the client apparatus 110 performs another process corresponding to the input operation received at step S601: YES (step S615), thereby ending a series of the processes.

In FIG. 7, a process procedure performed by the server apparatus 120 configuring the network system 100 according to the embodiment of the present invention is depicted. In the flowchart of FIG. 7, first, the server apparatus 120 determines whether a process request broadcasted (transmitted) by the client apparatus 110 has been received (step S701).

At step S701, the server apparatus 120 determines whether a process request broadcasted (transmitted) by the client apparatus 110 and broadcasted as any one among a setting change request, a setting acquisition request, and a search request, has been received. At step S701, if no process request has been received (step S701: NO), the server apparatus 120 waits until a process request is received.

At step S701, when a process request broadcasted (transmitted) by the client apparatus 110 has been received (step S701: YES), the server apparatus 120 temporarily stores the received process request (step S702). At step S702, for example, the server apparatus 120 temporarily stores the process request received at step S701: YES to a nonvolatile recording medium such as a RAM.

Information temporarily stored to the temporary storing unit 523 may be information that is based on the packet format transmitted and received between the apparatuses. More preferably, concerning a search request and a setting acquisition request, information indicating whether a request has been received may be stored alone. Further, more preferably, for example, the information may be implemented as 1-bit flag information enabling the setting-acquisition-request-reception determining unit 529 and the search-request-reception determining unit 530 above to determine reception when the value of 1 and no reception when the value is 0. As a result, the data capacity required of the temporary storing unit 523 can be further reduced and the cost of the unit implementing the temporary storing unit 523 can be reduced.

Next, the server apparatus 120 determines whether the status thereof at the time that the process request is received at step S701: YES is standby (step S703). At step S703, if the status of the server apparatus 120 at the time when the process request is received at step S701: YES is not standby (step S703: NO), the server apparatus 120 proceeds to step S706.

At step S703, if the status of the server apparatus 120 at the time when the process request is received at step S701: YES is standby (step S703: YES), the server apparatus 120 switches the status such that the status thereof becomes "receiving request" (step S704), and begins timing the time that elapses after the status is switched to "receiving request" (step S705).

Next, the server apparatus 120 determines whether the elapsed time since the status was switched to "receiving request", has become at least equal to a given period (step S706). At step S706, if the elapsed time since the status was switched to "receiving request", is less than the given period (step S706: NO), the server apparatus 120 returns to step S701 and determines whether another process request has been received.

At step S706, if the elapsed time since the status was switched to "receiving request", has exceeded or become equal to the given period (step S706: YES), the server apparatus 120 determines whether a setting change request is among the temporarily stored process requests (step S707). At step S707, if a setting change request is not among the temporarily stored process requests (step S707: NO), the server apparatus 120 proceeds to step S709. At step S707, if a setting change request is among the temporarily stored process requests (step S707: YES), the server apparatus 120 changes the setting information thereof, based on the received setting change request (step S708).

Next, the server apparatus 120 determines whether a setting acquisition request is among the temporarily stored process requests (step S709). At step S709, if a setting acquisition request is not among the temporarily stored process requests (step S709: NO), the server apparatus 120 proceeds to step S712. At step S709, if a setting acquisition request is among the temporarily stored process requests (step S709: YES), the server apparatus 120 generates as response information, a setting acquisition response (step S710), and transmits the generated setting acquisition response (step S711).

At step S711, for example, the server apparatus 120 may broadcast the setting acquisition response generated at step S710 to all of the client apparatuses 110 configuring the network 130. Further, at step S711, for example, the server apparatus 120 may transmit the setting acquisition response generated at step S710 to the concerned client apparatus 110 only.

Next, the server apparatus 120 determines whether a search request is among the temporarily stored process requests (step S712). At step S712, if a search request is not among the temporarily stored process requests (step S712: NO), the server apparatus 120 proceeds to step S715. At step S712, if a search request is among the temporarily stored process requests (step S712: YES), the server apparatus 120 generates as response information, a search response (step S713), and transmits the generated search response (step S714).

At step S714, for example, the server apparatus 120 may broadcast the search response generated at step S713 to all of the client apparatuses 110 configuring the network 130. Further, at step S714, for example, the server apparatus 120 may transmit the search response generated at step S713 to the concerned client apparatus 110 only.

Subsequently, the server apparatus 120 renews all of the information stored in the temporary storing unit 523 as information for no reception (step S715), and switches the status to standby (step S716), thereby ending a series of the processes. The process at step S715 and the process at step S716 may be executed in reversed order. In other words, after switching the status to standby, the server apparatus 120 may set the information stored in the temporary storing unit 523 to information for no reception.

As described, the server apparatus 120 configuring the network system 100 according to the embodiment of the present invention is connected via the network to the client apparatus 110, stores each process request from the client apparatus 110 for a given interval, and if the status of the server apparatus 120 is standby at the time when a process request is received, the server apparatus 120 switches the status to a state of receiving a request and measures the time that elapses after the status is switched to the state of receiving a request. When the elapsed time since the status was switched to a state of receiving a request, has reached a given period, the server apparatus 120 has a characteristic of executing a process that corresponds to the temporarily stored process request.

As a result, if a process request is received from multiple client apparatuses 110 during the given period, the server apparatus 120, at the time when the given period has elapsed, broadcasts response information to the client only once if response is necessary. As a result, compared to a case where each time a process request is received, a process corresponding to the process request is executed, the process load on the server apparatus 120 consequent to the process corresponding to the process request can be reduced.

In this manner, compared to a case where each time a process request is received, response information is specifically transmitted to the client apparatus 110 that is the transmission source of the process request, the server apparatus 120 configuring the network system 100 according to the embodiment of the present invention enables a reduction of the process load that is placed on the server apparatus 120 for transmitting response information and further suppresses increases in the traffic on the network and enables a reduction of the process load that is placed on the client apparatus 110 for receiving response information.

Further, upon determining that the elapsed time since the status of the server apparatus 120 was switched to the state of receiving a request, has reached the given period, the server apparatus 120 configuring the network system 100 according to the embodiment of the present invention determines whether a temporarily stored process request is a setting change request and whether a temporarily stored process request is a setting acquisition request. If a temporarily stored process request is a setting change request, based on the setting change request received last among the setting change requests received up to the elapse of the given period, which begins when the status is switched to the state of receiving a request, the server apparatus 120 updates the setting information stored in the nonvolatile recording medium that stores setting information, which can be set specific to the server apparatus 120. Further, the server apparatus 120 has a characteristic that if a temporarily stored process request is a setting acquisition request, the server apparatus 120 broadcasts response information that includes updated setting information.

As a result, if multiple setting change requests are received from client apparatuses 110 during the given period, the server apparatus 120 can update the setting information on the nonvolatile recording medium, based on the newest setting change request received last during the given period. As a result, compared to a case where the setting information is updated each time a setting change request is received, the process load placed on the server apparatus 120 and elated to the updating of setting information can be reduced.

Further, as a result, if multiple setting acquisition requests are received from client apparatuses 110 during the given period, the server apparatus 120 broadcasts only once, the setting information that has been updated based on the newest setting change request received last. Consequently, compared to a case where the setting information is updated each time a setting acquisition request is received, the process load placed on the server apparatus 120 and related to transmission of the setting information can be reduced.

In this manner, compared to a case where the setting information stored on the nonvolatile recording medium is updated each time a setting change request is received, the server apparatus 120 configuring the network system 100 according to the embodiment of the present invention enables the number of times that the nonvolatile recording medium is written to (overwritten) to be reduced and enables deterioration of the nonvolatile recording medium to be suppressed.

Further, compared to a case where each time a setting acquisition request is received, response information is specifically transmitted to the client apparatus 110 that is the transmission source of the setting acquisition request, the server apparatus 120 configuring the network system 100 according to the embodiment of the present invention enables the process load on the server apparatus 120, for transmission of the response information to be reduced and further suppresses increases in the traffic on the network 130 and enables the process load on the client apparatus 110 for receiving the response information to be reduced.

Further, when the elapsed time from when the status of the server apparatus 120 is switched to a state of receiving a request reaches a given period, the server apparatus 120 configuring the network system 100 according to the embodiment of the present invention determines whether a temporarily stored process request is a search request. If a temporarily stored process request is determined to be a search request, the server apparatus 120 broadcasts response information that includes the identification of the server apparatus 120 and that has a data volume that is less than the data volume of response information that includes the setting information.

As a result, if multiple search requests are received from client apparatuses 110 during the given period, the server apparatus 120 broadcasts only once at the time when the given period elapses, response information having a data volume that is less than the data volume of response information that includes setting information. Consequently, compared to a case where response information that includes setting information is transmitted, the process load placed on the server apparatus 120 and related to the transmission of response information can be reduced.

In this manner, if multiple search requests are received from multiple client apparatuses 110 during the given period, the server apparatus 120 configuring the network system 100 according to the embodiment of the present invention broadcasts only once at the time when the given period elapses, response information having a data volume that is less than the data volume of response information that includes setting information. As a result, compared to a case where each time a setting acquisition request is received, response information is transmitted specifically to the client apparatus 110 that is the transmission source of the setting acquisition request, the server apparatus 120 enables a reduction of the process load that is placed on the server apparatus 120 for transmitting response information and further suppresses increases in the traffic on the network and enables a reduction of the process load that is placed on the client apparatus 110 for receiving response information.

At the time when a search request is transmitted from the client apparatus 110, since it favorable to be able to confirm at the client apparatus 110, the server apparatus 120 connected to the network 130, by broadcasting response information omitting information such as the setting information of the server apparatus 120, the process load that is placed on the server apparatus 120 for transmitting response information can be assuredly reduced, increases in the traffic on the network 130 can be suppressed, and the process load that is placed on the client apparatus 110 for receiving response information can be reduced.

The information processing method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

To solve the problems of the conventional technologies and achieve an object, the server apparatus according to the present invention is a server apparatus that is connected to a client apparatus via a network and has a characteristic of including a process request receiving unit that receives a process request transmitted from the client apparatus; a temporary storing unit that each time a process request is received by the process request receiving unit, stores therein for a given interval, the received process request; a status determining unit that when a process request is received by the process request receiving unit, determines whether status of the server apparatus is standby; a timing unit that when the status is determined by the status determining unit to be standby, switches the status to a state of receiving a request and measures the time that elapses after the status is switched to the state of receiving a request; an elapsed time determining unit that based on the elapsed time measured by the timing unit, determines whether the elapsed time has reached a given period; and a request executing unit that when the elapsed time is determined by the elapsed time determining unit to have reached the given period, executes a process that corresponds to the process request stored in the temporary storing unit.

According to the present invention, when the same process request is received multiple times during the given period, and if response is required by the client apparatus, the server apparatus broadcasts response information only once at the time when the given period elapses. As a result compared to a case where each time a process request is received, a process corresponding to the process request is executed, the process load that is placed on the server apparatus for the process corresponding to the process request can be reduced.

Further, in the invention above, the server apparatus according to the present invention has a characteristic of including a nonvolatile recording medium that stores therein setting information that can be set specific to the server apparatus; a setting-change-request-reception determining unit that when the elapsed time is determined by the elapsed time determining unit to have reached the given period, determines whether the process request stored in the temporary storing unit is a setting change request that requests changing of the setting information, which can be set specific to the server apparatus; and a setting-acquisition-request-reception determining unit that when the elapse time is determined by the elapsed time determining unit to have reached the given period, determines whether the process request stored in the temporary storing unit is a setting acquisition request that requests transmission of the setting information, where the request executing unit, when the process request is determined by the setting-change-request-reception determining unit to be a setting change request, updates the setting information on the nonvolatile recording medium, based on the setting change request received last among the setting change requests stored in the temporary storing unit; and when the process request is determined by the setting-acquisition-request-reception determining unit to be a setting acquisition request, broadcasts response information that includes the setting information that has been updated based in the setting change request received last.

According to the present invention, if multiple setting change requests from the client apparatuses are received during the given period, at the time when the given period elapses, the server apparatus can update the setting information on the nonvolatile recording medium, based on the newest setting change request received last. As a result, compared to a case where each time a setting change request is received, the setting information is updated, the process load that is placed on the server apparatus and related to the updating of the information, can be reduced.

Further, according to the present invention, if multiple setting acquisition requests from the client apparatuses are received during the given period, the server apparatus broadcasts only once, the setting information that has been updated based on the newest setting change request that was received last. As a result, compared to a case where each time a setting acquisition request is received, setting information is transmitted, the process load that is placed on the server apparatus and related to transmission of the setting information can be reduced.

Further, in the invention above, the server apparatus according to the present invention has a characteristic of including a search-request-reception determining unit that when the elapsed time is determined by the elapsed time determining unit to have reached the given period, determines whether the process request stored in the temporary storing unit is a search request that requests transmission of identification information of the server apparatus, where the request executing unit, when the process request is determined by the search-request-reception determining unit to be a search request, broadcasts response information that includes the identification information of the server apparatus and has a data volume that is less than the data volume of response information that includes the setting information.

According to the present invention, if multiple search requests from the client apparatuses are received during the given period, the server apparatus broadcasts only once at the time when the given period has elapsed, response information having a data volume that is less than the data volume of response information that includes setting information. As a result, compared to a case where response information that includes setting information is transmitted, the process load that is placed on the server apparatus and related to transmission of response information can be reduced.

Further, an information processing method according to the present invention is used by a server apparatus that is connected to a client apparatus, via a network. The information processing method has a characteristic of including a process request receiving step of receiving a process request transmitted from the client apparatus; a temporary storing step of storing for a given interval and each time a process request is received at the process request receiving step, the received process request; a status determining step of determining whether status of the server apparatus is standby, when a process request is received at the process request receiving step; a timing step of switching the status to a state or receiving a request, when the status is determined at the status determining step to be standby, and of measuring the time that elapses after the status is switched to the state of receiving a request; an elapsed time determining step of determining based on the elapsed time measured at the timing step, whether the elapsed time has reached a given period; and a request executing step of executing with respect to the client apparatus and when the elapsed time is determined at the elapsed time determining step to have reached the given period, a process that corresponds to the process request stored in a temporary storing unit.

According to the present invention, for the server apparatus that has received multiple times, the same process request from multiple client apparatuses, if response is required by the client apparatus, response information can be broadcasted only once at the time when the given period elapses. As a result, compared to a case where each time a process request is received, a process that corresponds to the process request is executed, the process load placed on the server apparatus for the process corresponding to the process request can be reduced.

The server apparatus and the information processing method according to the present invention enable reductions in the process load placed on the server apparatus for performing processes related to process requests and further enable suppression of increases of traffic on the network to be effected.

The server apparatus and the information processing method according to the present invention further enable deterioration of the nonvolatile recording medium to be suppressed.

In this manner, the server apparatus and the information processing method according to the present invention are applicable to a server apparatus for which setting information can be changed through an operation from a client apparatus connected to a network and to an information processing method used by the server apparatus. The server apparatus and the information processing method are particularly suitable for a server apparatus for which setting information can be changed through an operation from a client apparatus connected to a network on which no DHCP resides and to an information processing method used by the server apparatus.

What is claimed is:

1. A server apparatus connected to a client apparatus, via a network, the server apparatus comprising:
    a processor;
    a memory;
    a process request receiving unit that receives a process request transmitted from the client apparatus;
    a temporary storing unit that each time a process request is received by the process request receiving unit, stores therein for a given interval, the received process request;
    a status determining unit that when a process request is received by the process request receiving unit, determines whether status of the server apparatus is standby;
    a timing unit that when the status is determined by the status determining unit to be standby, switches the status to a state of receiving a request and measures a time that elapses after the status is switched to the state of receiving a request;
    an elapsed time determining unit that based on the elapsed time measured by the timing unit, determines whether the elapsed time has reached a given period;
    a request executing unit that when the elapsed time is determined by the elapsed time determining unit to have reached the given period, executes a process that corresponds to the process request stored in the temporary storing unit;
    a nonvolatile recording medium that stores therein setting information that can be set specific to the server apparatus;
    a setting-change-request-reception determining unit that when the elapsed time is determined by the elapsed time determining unit to have reached the given period, determines whether the process request stored in the temporary storing unit is a setting change request that requests changing of the setting information, which can be set specific to the server apparatus; and a setting-acquisition-request-reception determining unit that when the elapse time is determined by the elapsed time determining unit to have reached the given period, determines whether the process request stored in the temporary storing unit is a setting acquisition request that requests transmission of the setting information, wherein the request executing unit, when the process request is determined by the setting-change-request-reception determining unit to be a setting change request, updates the setting information on the nonvolatile recording medium, based only on the setting change request received last among the setting change requests stored in the temporary storing unit; and when the process request is determined by the setting acquisition-request-reception determining unit to be a setting acquisition request, broadcasts only once response information that includes the setting information that has been updated based on the setting change request received last.

2. The server apparatus according to claim 1, further comprising a search-request-reception determining unit that when the elapsed time is determined by the elapsed time determining unit to have reached the given period, determines whether the process request stored in the temporary storing unit is a search request that requests transmission of identification information of the server apparatus, wherein the request executing unit, when the process request is determined by the search-request-reception determining unit to be a search request, broadcasts response information that includes the identification information of the server apparatus and has a data volume that is less than the data volume of response information that includes the setting information.

3. An information processing method used by a server apparatus that is connected to a client apparatus, via a network, the information processing method comprising:

a process request receiving step of receiving a process request transmitted from the client apparatus;

a temporary storing step of storing for a given interval and each time a process request is received at the process request receiving step, the received process request;

a status determining step of determining whether status of the server apparatus is standby, when a process request is received at the process request receiving step;

a timing step of switching the status to a state of receiving a request, when the status is determined at the status determining step to be standby, and of measuring a time that elapses after the status is switched to the state of receiving a request;

an elapsed time determining step of determining based on the elapsed time measured at the timing step, whether the elapsed time has reached a given period;

a request executing step of executing with respect to the client apparatus and when the elapsed time is determined at the elapsed time determining step to have reached the given period, a process that corresponds to the process request stored in a temporary storing unit;

a setting storing step of storing setting information that can be set specific to the server apparatus in a nonvolatile recording medium;

a setting-change-request-reception determining step of determining whether the process request stored by the temporary storing step is a setting change request that requests changing of the setting information, which can be set specific to the server apparatus, when the elapsed time is determined by the elapsed time determining step to have reached the given period; and a setting-acquisition-request-reception determining step of determining whether the process request stored by the temporary storing step is a setting acquisition request that requests transmission of the setting information, when the elapse time is determined by the elapsed time determining step to have reached the given period, wherein the request executing step, when the process request is determined by the setting-change-request-reception determining step to be a setting change request, updates the setting information on the nonviolatile recording medium, based only on the setting change request received last among the setting change requests stored by the temporary storing step; and when the process request is determined by the setting-acquisition-request-reception determining step to be a setting acquisition request, broadcasts only once response information that includes the setting information that has been updated based on the setting change request received last.

* * * * *